United States Patent [19]

Güsten et al.

[11] Patent Number: 4,876,029

[45] Date of Patent: Oct. 24, 1989

[54] SUBSTITUTED AND UNSUBSTITUTED RING-BRIDGED PARA-OLIGOPHENYLENE UV LASER DYES

[75] Inventors: Hans Güsten, Speyer; Hans-Joachim Ache, Karlsruhe; Monika Rinke, Eggenstein-Leopoldhafen; Hermann O. Wirth, Bensheim, all of Fed. Rep. of Germany

[73] Assignee: Kernforschungszentrum Karlsruhe Gesellschaft mit Beschränkter Haftung, Karlsruhe, Fed. Rep. of Germany

[21] Appl. No.: 674,403

[22] Filed: Nov. 23, 1984

[30] Foreign Application Priority Data

Mar. 5, 1984 [DE] Fed. Rep. of Germany ....... 3408028

[51] Int. Cl.$^4$ .............................................. C09K 11/06
[52] U.S. Cl. .................................. 252/301.17; 372/53
[58] Field of Search .................... 252/301.17; 372/53, 372/54, 52; 549/456, 458

[56] References Cited

U.S. PATENT DOCUMENTS

| | | | |
|---|---|---|---|
| 3,600,455 | 8/1971 | Wirth et al. | 252/301.17 |
| 3,774,122 | 11/1973 | Webster | 372/53 |
| 3,822,270 | 7/1974 | Reynolds | 372/53 |
| 3,873,940 | 3/1975 | Drexhage | 372/53 |
| 3,904,982 | 9/1975 | Dienes | 252/301.17 |
| 3,976,655 | 8/1976 | Hammond | 546/307 |
| 3,986,140 | 10/1976 | Angadiyavar et al. | 252/301.17 |
| 4,005,092 | 1/1977 | Reynolds | 372/53 |
| 4,072,911 | 2/1978 | Hartig et al. | 252/301.17 |
| 4,079,082 | 3/1978 | Hammond | 564/307 |
| 4,100,509 | 7/1978 | Walther et al. | 252/301.17 |
| 4,208,501 | 6/1980 | Yee et al. | 252/301.17 |
| 4,256,900 | 3/1981 | Raue | 252/301.17 |
| 4,326,066 | 4/1982 | Eckstein et al. | 252/301.17 |
| 4,616,309 | 2/1987 | Arisawa et al. | 372/53 |

FOREIGN PATENT DOCUMENTS

| | | |
|---|---|---|
| 2700292 | 7/1981 | Fed. Rep. of Germany . |
| 2938132 | 9/1981 | Fed. Rep. of Germany . |
| 3007234 | 11/1981 | Fed. Rep. of Germany . |
| 3225741 | 2/1984 | Fed. Rep. of Germany . |

OTHER PUBLICATIONS

Hofstadter, R. "Scintillation Counter" in: McGraw-Hill Encyclopedia of Science & Technology (6th ed.) vol. 16, pp. 114–115.

Berlman, I. B. et al., "Systematics of the Electronic Spectra of p-Oligophenylenes and Their Substituted Analogs" J. Phys. Chem. vol. 75, No. 3, 1971, pp. 318–325.

Greenstein, J. L. "Fluorescence" in: "McGraw-Hill Encyclopedia of Science & Technology" (6th ed.) vol. 7 pp. 203–204.

(List continued on next page.)

*Primary Examiner*—John F. Niebling
*Assistant Examiner*—Steven P. Marquis
*Attorney, Agent, or Firm*—Spencer & Frank

[57] ABSTRACT

The present invention relates to laser dyes having improved characteristics comprising substituted and unsubstituted ring-bridged p-oligophenylenes having at least four and no more than 8 phenyl groups. These improved laser dyes can be excited by pump lasers and are capable of producing stimulated coherent emission in the near ultraviolet range, particularly in the range below 400 nm, and have improved photostability. The p-oligophenylenes used according to the invention have the following characteristics:

(a) the number of bridges is a number from 1 to 7 but only one bridge exists between two adjacent phenylene groups;

(b) each bridge in the O,O'-cis position engages two adjacent phenylene groups;

(c) the bridges represent the same and/or different species from a defined group; and (d) the phenylene rings may either be unsubstituted, except for the bridges, or one or several phenylene rings in the molecule, independent of whether they are bridged or not, may have one or two radicals $R_3$ per phenylene ring, with different phenylene rings having the same or different radicals $R_3$.

18 Claims, 1 Drawing Sheet

OTHER PUBLICATIONS

Klick, C. C. et al. "Luminescence" in: McGraw-Hill Encyclopedia of Science & Technology (6th ed.) vol. 10 pp. 215-221.

B. H. Winters et al., "Photochemical Products in Coumarin Laser Dyes," *Applied Physics Letters*, vol. 25, No. 12, Dec. 15th, 1974, pp. 723-725.

V. S. Antonov et al., "Dye Stability Under Eximer-Laser Pumping: II. Visible and UV Dyes", Applied Physics, vol. B 32, (1983), pp. 9-14.

Ultraviolet Organic Liquid Lasers, Furumoto/Ceccon, IEEE Journal of Quantum Electronics, vol. QE-6, No. 5, May 1970, pp. 262-268.

Laser Properties of Triazinyl-Stilbene Compounds, Optics Communications, vol. 24, No. 1, 1978, pp. 33-37.

Rinke Chem. Abst. 102 122727n (1985) p. 611.

O. K. Bazyl et al., IEEE Journal of Quantum Electronics, "Dependence of the spectral luminescence and lasing properties of some aromatic derivatives of benzoxazole on their electron structure" vol. QE-9, No. 5, pp. 147-150, May 1973.

Theodore G. Pavlopoulos, IEEE Journal of Quantum Electronics, "Prediction of Laser Action Properties of Organic Dyes from Their Structure and the Polarization Characteristics of Their Electronic Transitions", vol. QE-9, No. 5, pp. 510-516, May 1973.

Wirth et al., Chem. Abstracts 60(1963) col. 5363d.

Wirth et al., Chemical Abstracts vol. 60 col. 5416d.

Wirth et al., Chemical Abstracts col. 64(1966) vol. 19529g.

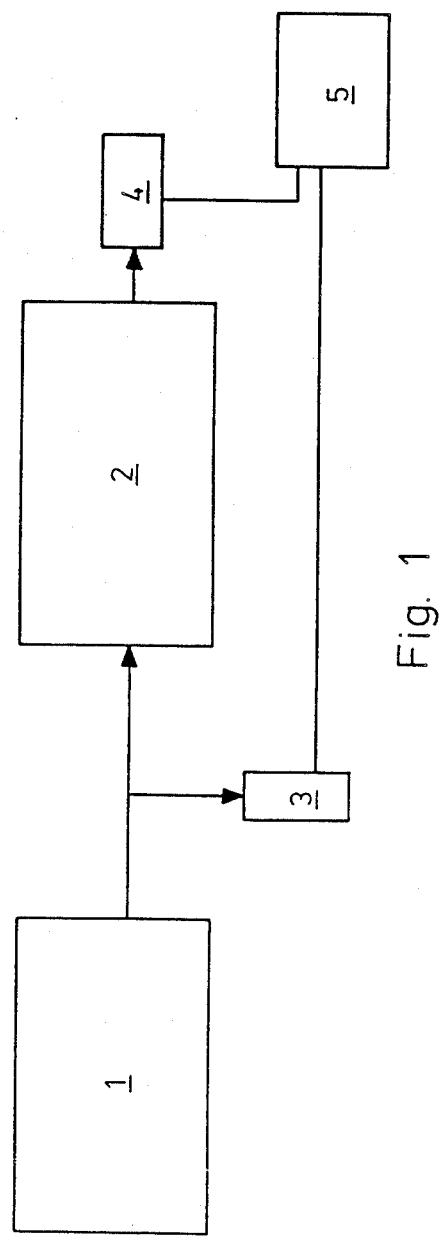
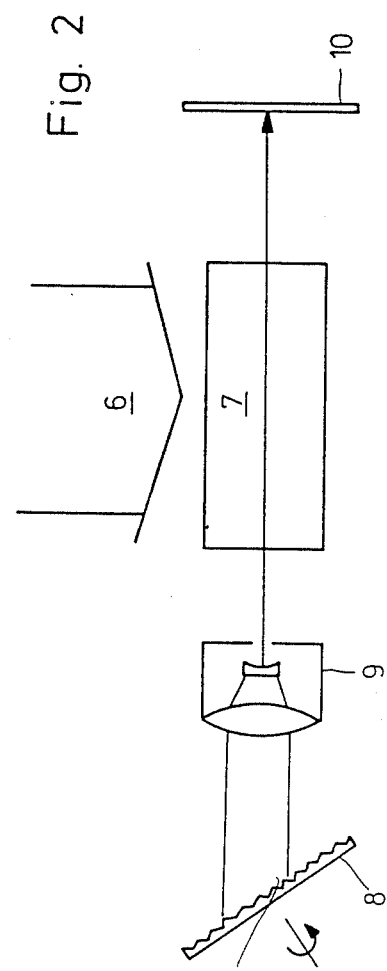

SUBSTITUTED AND UNSUBSTITUTED RING-BRIDGED PARA-OLIGOPHENYLENE UV LASER DYES

The present invention relates to the use of substituted and unsubstituted ring-bridged p-oligophenylenes having at least 4 and no more than 8 phenyl groups as laser dyes.

BACKGROUND OF THE INVENTION

Organic dye molecules capable of emitting fluorescence are often able, in suitable solvents, to produce coherent emissions as a result of optical excitation and are thus generally usable as laser dyes. A detailed overview of organic laser dyes of $\lambda_{max} > 400$ nm is given by K. H. Drexhage "Structure and Properties of Laser Dyes", pp. 144 to 193 in "Dye Lasers", *Topics in Applied Physics*, Volume 1, Publisher F. P. Schäfer, Springer Verlag (Berlin-Heidelberg—New York), 1977.

Optical excitation is effected with the aid of light sources, such as gas lasers ("pump lasers"). Examples of these are nitrogen, argon and krypton ion lasers, and excimer lasers. The dissolved organic molecules of the laser dye are brought from their ground state into an electronically excited state. If the number of laser dye molecules in the electronically excited state exceeds the number of molecules in the ground state (population inversion), stimulated emission of light can take place. This stimulated emission is started in an optical resonator where a quartz cell contains the solution of the laser dye. Circulating the dye-solution in a closed circuit avoids local overheating which would lead to optical inhomogeneities (schlieren formation). The closed unit of the optical system including mirrors, prisms, reflection grating and dye-solution cell is called a dye laser. Within the range of fluorescence emission of the laser dye, any desired wavelength can be coupled out of such a dye laser.

The great advantage of dye lasers compared to gas lasers is that it is possible to select tuned wavelengths for many different applications over a wide range of the fluorescence spectrum of the organic dye. Fields of use for such variable frequency lasers are, inter alia, chemical analytics, high resolution spectroscopy, fluorescence spectroscopy, photoionization spectroscopy, isotope separation, and etc.

The laser dyes known today cover a range from the near ultraviolet (about 320 nm) to the near infrared (about 1000 nm). In the UV range, particularly in the range below 450 nm, there are only a few photostable laser dyes. Since the energies radiated in the UV range by the pump laser lie in the range of the binding energies of organic molecules, the stimulated emission competes with the photochemical decomposition (e.g. with the decay) of the laser dye. Due to the very high energy density of the pump laser, the quantum yield for the photochemical decomposition of the laser dye must lie below $10^{-6}$. The photostability of the laser dye is significant particularly for long-term tests. Thus, for example, although compounds from the class of coumarins are excellent laser dyes which emit in the blue range, they exhibit only poor photostability [B. H. Winters, H. I. Mandelberg and W. B. Bohr, *Appl. Phys. Letters* 25, 723, (1974)]. Similar conditions exist with the patented bisstyryl-biphenyl compounds (German Pat. No. 2,700,292) and with some laser dyes belonging to the oxazol and oxadiazole series which are used also as organic scintil-lators [V. S. Antonov and K. L. Hohla, *Appl. Phys.* Volume 32, 9 (1983)].

In experiments to obtain a shorter wave laser emission than 323 nm, which was accomplished in a $1 \times 10^{-3}$ molar paraterphenyl solution in cyclohexane, substituted paraterphenyls were found (DE-OS No. 3,007,234). The substituted p-terphenyls mentioned in Table 2 of this publication have laser dye tuning ranges ($\Delta\lambda$) which lie between 311.2 and 360.5 nm. P-terphenyl itself has a tuning range between 321.8 and 365.5 nm.

Fluorescence dyes that can be derived from p-quaterphenyl and are able to support 2 to 4 sulfonic acid ester substituents and further substituents, such as, for example, the dye known by the abbreviated form "Polyphenyl 1"

and their use as laser dyes are known from DE-OS No. 2,938,132.

SUMMARY OF THE INVENTION

It is the object of the present invention to provide dye lasers using highly photostable laser dyes which can be excited by pump lasers and which are capable of stimulated coherent emission in the near ultraviolet range, particularly in the range below 400 nm.

This is accomplished by the use of substituted and unsubstituted, ring-bridged p-oligophenylenes having at least 4 and no more than 8 phenyl groups as laser dyes having improved characteristics, wherein (a) the number of bridges

is a number from 1 to 7, but in any case only one bridge exists between any two adjacent phenyl groups;

(b) each bridge in the ortho,ortho'-cis position joins two adjacent phenyl groups;

(c) the bridges

represent identical and/or different species from the group

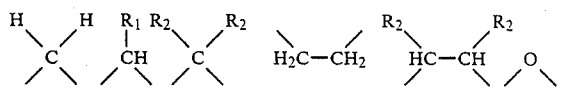

where $R_1$ represents alkyl radicals having 1 to 8 C atoms, and $R_2$ represents the same alkyl radical selected from the group of $CH_3$, $C_2H_5$, n-propyl, isopropyl, n-butyl and isobutyl; and (d) the phenyl rings may either be unsubstituted except for the bridges, one or a plurality of phenyl rings in the molecule, independent of whether they are bridged or not, may have one or two identical or different radicals $R_3$ per phenyl ring, or different phenyl rings may have the same or different radicals $R_3$; wherein $R_3$ represents alkyl groups having 1 to 5 C atoms, $CF_3$, alkoxy groups having 1 to 8 C atoms, alkoxy groups derived from Guerbet alcohols (2-$C_{2n}$-$C_{2n+4}$ alcohols, where n=a whole number $\geq 1$), or alkoxy groups having an oxalkyl side chain with 2 to 5 C atoms.

BRIEF DESCRIPTION OF THE DRAWINGS

FIG. 1 is a block diagram representation of a dye laser system including means to measure the efficiency of the dye laser performance.

FIG. 2 is a symbolic representation of a dye laser.

DESCRIPTION OF THE PREFERRED EMBODIMENTS

The ring-bridged p-oligophenylenes for use according to the present invention are aromatic compounds having an oligophenyl basic structure comprising at least 4 paralinked aromatic rings under the condition that at least one of the diphenyl subunits per molecule is bridged once and that as a maximum all diphenyl units may be bridged, but in no case is each diphenyl unit bridged more than once.

For example:

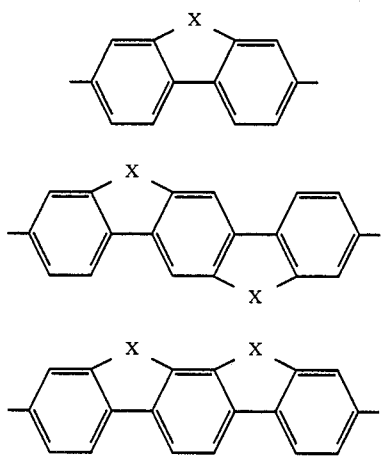

Guerbet alcohols are those alcohols which, like the species 2-ethyl-hexyl alcohol, 2-butyl-octyl alcohol, 2-hexyl-decyl alcohol and 2-octyl-dodecyl alcohol, can be combined under the abbreviated term 2-$C_{2n}$-$C_{2n+4}$ alcohols, wherein $C_{2n+4}$ represents the main chain and $C_{2n}$ represents the side chain in the 2-position.

All rings may also have additional substituents, preferably alkyl and alkoxy groups; however, solubility is most advantageously increased by long-chain branched alkyl or alkoxy groups. The number of substituents per aromatic fundamental building block (benzene ring) is 1, with a maximum of 2. These substituents have only a slight influence on the spectroscopic laser properties, such as tuning range, efficiency and photostability and serve primarily to increase solubility in the organic solvent.

The arrangement of the substituents is preferably such that the conjugation system of the molecule is interfered with as little as possible.

Typical representatives having the p-quaterphenyl structure are:

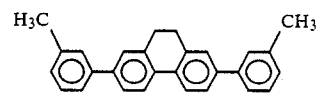

and

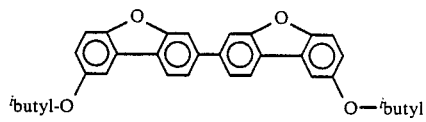

A typical representative having the p-quinquephenyl structure is:

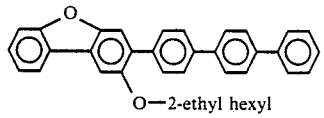

The synthesis of ring-bridged p-oligophenylenes have been described by Wirth et al.

H. O. Wirth, K. H. Gönner, R. Stück and W. Kern, Makromol. Chem. 63, 30 (1963)

H. O. Wirth, K. H. Gönner and W. Kern, Makromol. Chem. 63, 53 (1963)

H. O. Wirth, G. Waese and W. Kern, Makromol. Chem. 86, 139 (1965)

In general, the starting compounds such as fluorene, 9,10-dihydrophenanthrene or dibenzofurane are selectively iodinated according to the method described by Wirth et al. (H. O. Wirth, O. Königstein and W. Kern, Liebigs Ann. Chem. 634, 84 (1960).

Subsequently, the iodinated compounds are subject to the Ullmann or Co-Ullmann reaction with copper in high-boiling solvents. Thus, the Ullmann reaction of 2-iododibenzofurane results 2,2'-didibenzofurane, 2,7-diiodo-9,10-dihydrophenanthrene and 2-iodotoluene results 2,7-(di-2-tolyl)-9,10-dihydrophenanthrene in the Co-Ullmann reaction.

Bridging of the rings with a $CH_2$ group in the p-oligophenylenes produces a fluorene derivative. Ring bridging with the $CH_2$—$CH_2$ group produces a 9,10-dihydrophenanthrene derivative. Similarly, dibenzofurane is obtained from an oxygen bridge.

FIG. 1 is a block diagram representation of an apparatus employing an excimer laser 1 and a dye laser 2. The tuning range, efficiency and photostability are measured in the oscillator stage (FIG. 2) of the dye laser. The efficiency is determined from the slope of the plot: dye laser energy versus pump laser energy. Both energy values are measured by means of Joulemeters 3 and 4.

FIG. 2 is a symbolic representation of the oscillator assembly of a tunable dye laser. Pump laser light 6 stimulated light emission from the dye solution in the high speed (20 ml/s) flow cell 7. Tuning of the wavelengths in the dye laser is effected by means of a resonator system comprising reflection gating 8 and lens system 9. The second part of the resonator is mirror 10, a partially reflecting mirror, through which the tuned laser radiation is coupled out.

EXAMPLES

In the Examples that are reported in Table 1, the following photophysical and laser spectroscopical characteristics were measured:

fluorescence quantum yield, $Q_F$
fluorescence decay time, $\tau_F$
tuning range, $\Delta\lambda$
efficiency, $\eta$
photostability, $E^o/2$.

In all measurements, the concentration of the laser dye is set at the pump wavelength of excimer laser 1 of 308 nm so that 99.9% of the excitation light is absorbed in the flow cell 7 at a layer thickness of 0.15 cm. The pump energy of a maximum of 20 mJ per pulse is focused into the dye solution with a maximum energy density of 0.4 $J/cm^2$, the pulse frequency being 10 Hz.

Photostability was determined by measuring the dye laser energy as a function of the total pump energy absorbed in the dye solution, with the half-value energy $E^o/2$ being the dye laser energy at which the dye laser energy has dropped to one-half its original value. It is given as photons per molecule under consideration of the photon energy employed and the respective dye concentration as a molecule dependent parameter. This value is used as a measure for the photochemical stability of the laser dye. The photophysical and laser spectroscopic properties of a series of ring-bridged p-oligophenylenes described here are listed in Table 1. As a comparison, the photostability data etc. of the commercially available laser dyes "Stilben 3" and "Polyphenyl 1" are also given.

"Stilben 3"

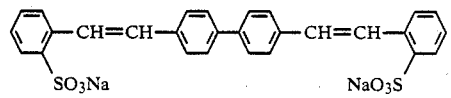

The exemplary p-oligophenylenes listed in Table 1 are provided for purposes of illustration and not to limit the invention, which is intended to include all variations, modifications, and equivalences within the scope of the appended claims.

TABLE 1

| Substance | $Q_F$ | $\tau_F$ [nsec] | Tuning Range [nm] $\Delta\lambda$ | Efficiency $\eta$ [%] | Photostability for $E^o/2$ [photons/molecule] | Concentration C [M/l] |
|---|---|---|---|---|---|---|
| Example 1 | 0.72 | 1.00 | 371–384 | 3.5 | 1880 | $5.2 \cdot 10^{-4}$ |
| Example 2 | 0.68 | 1.00 | 370–382 | 2.5 | 2450 | $4.9 \cdot 10^{-4}$ |
| Example 3 | 0.59 | 1.00 | 376–385 | 2.5 | 4609 | $5.5 \cdot 10^{-4}$ |
| Example 4 | 0.74 | 0.85 | 363–377 | 10.6 | 2080 | $4.7 \cdot 10^{-4}$ |
| Example 5 | 0.80 | 0.86 | 370–382 | 13.6 | 316 | $5.2 \cdot 10^{-4}$ |

TABLE 1-continued

Photophysical and laser spectroscopic properties of ring-bridged p-oligophenylenes in dioxane

| Substance | $Q_F$ | $\tau_F$ [nsec] | Tuning Range [nm] $\Delta\lambda$ | Efficiency $\eta$ [%] | Photostability for $E^o/2$ [photons/molecule] | Concentration C [M/l] |
|---|---|---|---|---|---|---|
| Example 6  | 0.73 | 0.82 | 365–377 | 9.9 | 8770 | $5.3 \cdot 10^{-4}$ |
| Example 7 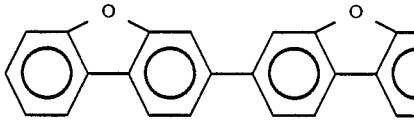 | 0.75 | 0.90 | 369–380 | 9.2 | 4100 | $4.9 \cdot 10^{-4}$ |
| Example 8 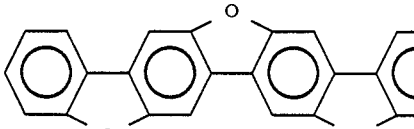 | 0.78 | 1.65 | 375–381 | 2.9 | 912 | $5.6 \cdot 10^{-4}$ |
| Example 9  $R = CH_2-CH\begin{smallmatrix}CH_3\\CH_3\end{smallmatrix}$ | — | — | 380–391 | 11.3 | 220 | $6.0 \cdot 10^{-4}$ |
| Example 10 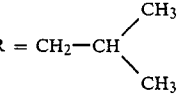 R' = 2-Ethyhexyl | — | — | 375–389 | 10.1 | 1150 | $7.1 \cdot 10^{-4}$ |
| Comparative Example 1 "Stilben 3" | 0.76 | 0.82 | 416–439 | 10.5 | 85 | $10 \cdot 10^{-4}$ |
| Comparative Example 2 "Polyphenyl 1" | — | — | 366–400+ | 5.8+ | 105+ | $3.5 \cdot 10^{-4}$ |

+ measured in diethylene glycol, since insoluble in dioxane

We claim:

1. A laser dye capable of stimulated coherent emission in the range below 400 nm comprising ring-bridged p-oligophenylenes having at least 4 and no more than 8 phenyl groups, and having at least one bridge between two adjacent phenyl groups but no more than one bridge between any two adjacent phenyl groups.

2. The laser dye as recited in claim 1, wherein the bridges are selected from the group consisting of:

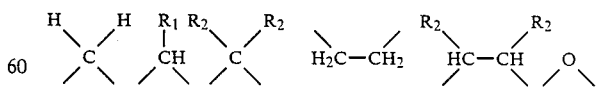

and $R_1$ is an alkyl radical having 1 to 8 carbon atoms and $R_2$ is the same alkyl radical selected from the group consisting of $CH_3$, $C_2H_5$, n-propyl, isopropyl, n-butyl and isobutyl.

3. The dye as recited in claim 1, wherein the phenyl rings are unsubstituted except for the bridges.

4. The laser dye as recited in claim 1, wherein at least one phenyl ring is substituted with one or two radicals $R_3$, whether bridged or not, wherein $R_3$ is an alkyl group having 1 to 5 carbon atoms, $CF_3$, an alkoxy group having 1 to 8 carbon atoms, an alkoxy group derived from 2- $C_{2n}$-$C_{2n+4}$ alcohols, wherein (n=a whole number) $\geq 1$, or an alkoxy group having an oxalkyl side chain with 2 to 5 carbon atoms.

5. The laser dye as recited in claim 4, wherein at least one phenyl ring is substituted with two identical $R_3$ radicals.

6. In a dye laser the improvement comprising a laser dye capable of stimulated coherent emission in the range below 400 nm which comprises at least one ring-bridged p-oligophenylene having from 4 to 8 phenyl groups, and having one bridge between any two adjacent phenyl groups.

7. The dye laser as recited in claim 6, wherein the bridges are selected from the group consisting of

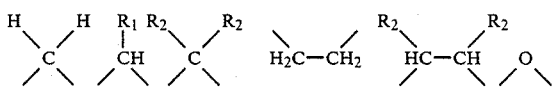

and $R_1$ is an alkyl radical having 1 to 8 carbon atoms and $R_2$ is the same alkyl radical selected from the group consisting of $CH_3$, $C_2H_5$, n-propyl, isopropyl, n-butyl and isobutyl.

8. The dye laser as recited in claim 6, wherein the phenyl rings are unsubstituted except for the bridges.

9. The dye laser as recited in claim 6, wherein at least one phenyl ring is substituted with one or two radicals $R_3$, wherein $R_3$ is an alkyl group having one to five carbon atoms, $CF_3$, an alkoxy group having one to eight carbon atoms, an alkoxy group derived from 2-$C_{2n}$-$C_{2n+4}$ alcohols, wherein n is a whole number $\geq 1$, or an alkoxy group having an oxalkyl side chain with 2 to 5 carbon atoms.

10. The dye laser as recited in claim 9, wherein at least one phenyl ring is substituted with two identical $R_3$ radicals.

11. In a method of lasing, the improvement comprising a laser dye capable of stimulated coherent emission in the range below 400 nm which comprises at least one ring-bridged p-oligophenylene having from four to eight phenyl groups, and having one bridge between any two adjacent phenyl groups.

12. The method of lasing as recited in claim 11, wherein the bridges are selected from the group consisting of:

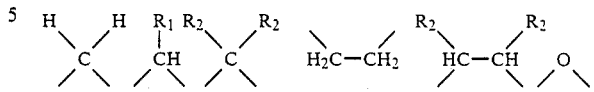

13. The method of lasing as recited in claim 11, wherein the phenyl rings are unsubstituted except for the bridges.

14. The method of lasing as recited in claim 11, wherein at least one phenyl ring is substituted with one or two radicals $R_3$, wherein $R_3$ is an alkyl group having one to five carbon atoms, $CF_3$, and alkoxy group having one to eight carbon atoms, an alkoxy group derived from 2-$C_{2n}$-$C_{2n+4}$ alcohols, wherein n is a whole number $\geq 1$, or an alkoxy group having an oxalkyl side chain with 2 to 5 carbon atoms.

15. The method of lasing as recited in claim 14, wherein at least one phenyl group is substituted with two identical $R_3$ radicals.

16. The laser dye as recited in claim 1, wherein said ring-bridged p-oligophenylenes consist essentially of

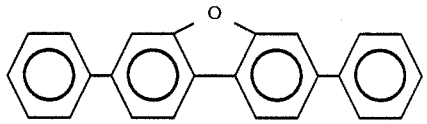

17. The dye laser as recited in claim 6, wherein said at least one ring-bridged p-oligophenylene consists essentially of

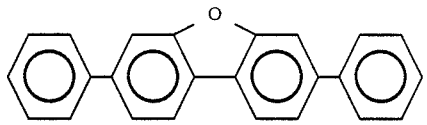

18. The method of lasing as recited in claim 11, wherein said at least one ring-bridged p-oligophenylene consists essentially of

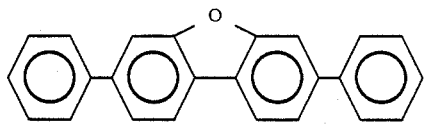

* * * * *